United States Patent [19]

Birukawa et al.

[11] Patent Number: 5,472,758

[45] Date of Patent: Dec. 5, 1995

[54] OPTICAL RECORDING MEDIUM FOR SHORT-WAVELENGTH OF LASER BEAM AND READ/WRITE/ERASE METHOD USING THE MEDIUM

[75] Inventors: Masahiro Birukawa; Motoyoshi Murakami, both of Hirakata, Japan

[73] Assignee: Matsushita Electric Industrial Co., Ltd., Osaka, Japan

[21] Appl. No.: 103,118

[22] Filed: Aug. 9, 1993

[30] Foreign Application Priority Data

Aug. 7, 1992 [JP] Japan .................................. 4-211056

[51] Int. Cl.⁶ ........................................... B32B 3/02
[52] U.S. Cl. .................... 428/64.4; 428/76; 428/192; 428/411.1; 428/446; 428/688; 428/704; 428/913; 346/76.1; 369/283
[58] Field of Search .......................... 428/64, 65, 76, 428/668, 689, 697, 913, 192, 411.1, 446, 688, 704, 913; 346/76 L, 135.1; 369/283, 288

[56] References Cited

U.S. PATENT DOCUMENTS

| 4,801,499 | 1/1989 | Aoyama et al. | 428/336 |
| 5,098,761 | 3/1992 | Watanabe et al. | 428/64 |
| 5,192,626 | 3/1993 | Sekiya et al. | 428/694 |
| 5,232,790 | 8/1993 | Arimune et al. | 428/694 |

FOREIGN PATENT DOCUMENTS

| 1-292649 | 11/1989 | Japan . |
| 3-147546 | 6/1991 | Japan . |

*Primary Examiner*—Patrick J. Ryan
*Assistant Examiner*—William A. Krynski
*Attorney, Agent, or Firm*—Wenderoth, Lind & Ponack

[57] ABSTRACT

An optical recording medium of a data rewritable type includes: a substrate; a first transparent dielectric layer formed on the substrate, having a refractive index substantially equal to the refractive index of said substrate; a second transparent dielectric layer formed on the first dielectric layer, having a refractive index greater than that of said first dielectric layer and having its thickness being not greater than 80 nm; and further includes an optical recording layer formed on the second dielectric layer, so that said first and second dielectric layers and optical recording layer are laminated in this order on said substrate, where the total film thickness of the first and second dielectric layers is set to be not smaller than 90 nm.

8 Claims, 11 Drawing Sheets

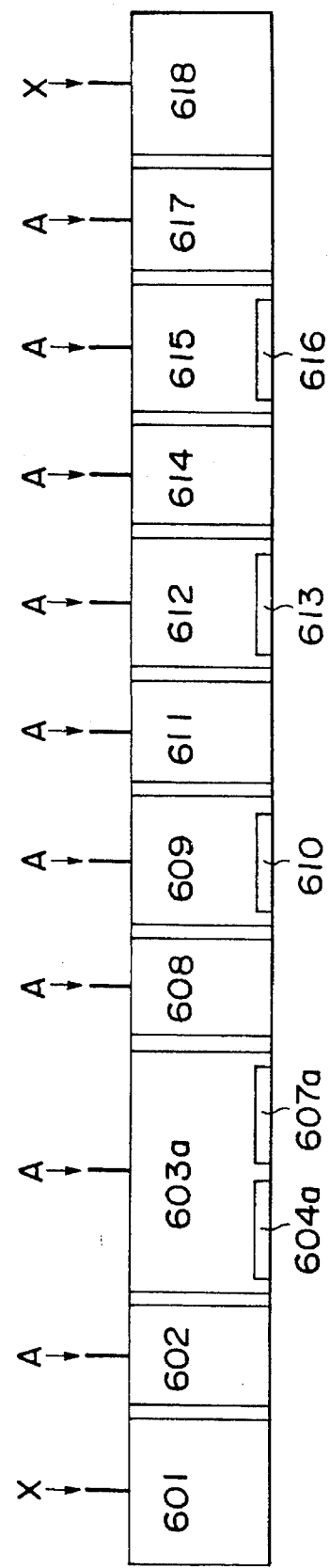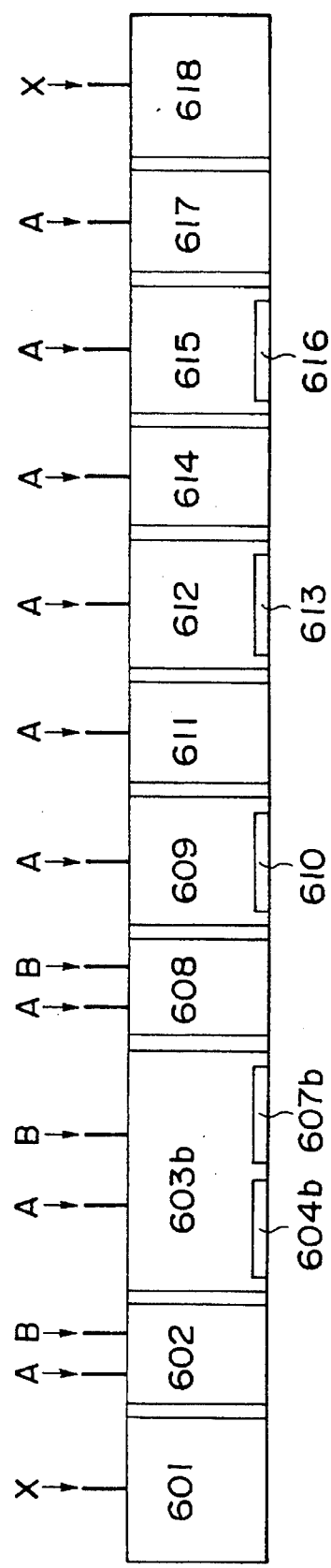
Fig.6(a)
Fig.6(b)

OPTICAL RECORDING MEDIUM FOR SHORT-WAVELENGTH OF LASER BEAM AND READ/WRITE/ERASE METHOD USING THE MEDIUM

BACKGROUND OF THE INVENTION

1. Field of the Invention

The present invention relates to an optical recording medium capable of rewriting data, and more particularly to such a medium for use in an external storage device of a computer, a video and/or audio recording device, a storage device of a game machine and the like, or multi-media combining these devices.

2. Description of the Prior Art

In recent years, a magneto-optical recording medium which is one of optical recording media capable of rewriting data thereon has been put into practical use as an optical recording medium capable of reading, writing and erasing data.

The following describes an exemplified conventional magneto-optical recording medium with reference to the attached drawings.

FIG. 4 shows a construction of a conventional magneto-optical recording medium. Referring to FIG. 4, the magneto-optical recording medium comprises a plastic substrate 1 provided with a tracking guide groove for tracking servo, a dielectric film 2 having a high refractive index, a magneto-optical thin film 3, an intermediate layer 4, a reflection film 5, and a protection layer 6.

The substrate 1 is usually composed of a polycarbonate substrate because the material can be easily molded and produced at a low cost. The dielectric film 2 having a high refractive index is composed of any of various dielectric materials such as silicon nitride, aluminum nitride, zinc sulfide, selenium sulfide, tantalum oxide, or a mixture of any of the materials and silicon oxide. Assuming that the refractive index is n and the wavelength of laser beam in the data read/write time is $\lambda$, the dielectric film 2 is made to have a film thickness of $\lambda/4n$ or less. Generally, silicon nitride, aluminum nitride, or tantalum oxide having a refractive index of 2.0 is used as the dielectric film 2 at a laser wavelength of 780 or 830 nm for read/write/erase of data, and therefore the dielectric film 2 having a high refractive index of 2.0 is usually made to have a film thickness of 100 to 110 nm.

The magneto-optical thin film 3 is usually made of an alloy of a rare earth such as Gd, Tb, or Dy and a transition metal such as Fe or Co, which is made to have a Curie point of 170° to 210° C. and made to have a film thickness of 20 to 40 nm.

The intermediate layer 4 is composed of any of various dielectric materials such as silicon nitride, aluminum nitride, zinc sulfide, selenium sulfide, tantalum oxide, or a mixture of any of the materials and silicon oxide in the same manner as the dielectric film 2, and made to have a film thickness of 10 to 40 nm.

The reflection film 5 is made of a metal mainly composed of aluminum and made to have a film thickness of 30 to 60 nm. The magneto-optical thin film 3 and the reflection film 5 are further protected by the protection layer 6 which is formed by laminating a polymer layer or laminating polymer and dielectric layers.

The above-mentioned conventional construction has caused no trouble at the wavelength (780 nm or 830 nm) of laser beam. However, in order to execute read/write/erase of data at a shorter wavelength (680 nm, 532 nm, or less) for the purpose of achieving the more high-density recording, a new problem arises. The problem is that, since the film thickness of the dielectric film 2 is set at around $\lambda/4n$, the film thickness is required to be thinner according as the wavelength is reduced in proportion to the wavelength $\lambda$ of laser beam in executing read/write/erase of data.

The dielectric film 2 has two functional effects, one is an effect of enhancing a rotation angle of linear polarization plane obtained by the magneto-optical thin film 3. The other is an effect of thermally insulating between the plastic substrate 1 having a low heat resistance (low softening temperature) and the magneto-optical thin film 3.

In the data erasing time, generally a greater power is used to securely erase the recorded marks (written domain), and therefore the temperature of the magneto-optical thin film 3 is momentarily increased up to a temperature of about 400° C. In regard to the above, the reason why the substrate of any conventional magneto-optical recording medium does not deteriorate despite the fact that a plastic substrate made of polycarbonate resin has a softening temperature of 130° to 140° C. is that the dielectric film 2 has a heat insulation effect concurrently with the enhancement effect.

However, when the dielectric film 2 is made thinner in proportion to $\lambda/4n$ as the wavelength of laser beam is reduced, the heat insulation effect gradually degrades. Particularly when data write/erase operations are repetitively executed many times, the substrate suffers a thermal damage. The above-mentioned problems are still more serious for the zinc sulfide, selenium sulfide having a high refractive index of 2.2 to 2.3, or a mixture of either of the materials and silicon oxide. This is because, in the construction, the dielectric film 2 made of the above-mentioned materials has a high refractive index and a film thickness at which the enhancement effect is maximized as described above, the film thickness is required to be thinner because of the high refractive index of the film, and therefore the optimum film thickness is reduced to about 80 nm even at the wavelength of laser beam of about 780 nm.

In the case where the dielectric film 2 is composed of a film made of a material such as silicon nitride, aluminum nitride, tantalum oxide having a refractive index of about 2.0, the film thickness is not greater than 90 nm according to a film thickness setting at which the enhancement effect is maximized when in read/write operation at a short wavelength $\lambda$ of laser beam of 680 nm or less. In the above case, the substrate suffers a thermal damage.

The following describes in detail the thermal damage of a plastic substrate, which has never been obvious before.

When more than several tens of tracks are subjected to continuous data erase/write operations, the groove provided on the substrate gradually deforms due to the repetitive operations. Furthermore, the reflectance at land portions between grooves is slightly reduced, and primary diffraction light increases to result in the increase of the push-pull signal for the tracking. In other words, the groove is gradually deformed. In the above case, when scores of tracks are subjected to continuous data erase/write operations, a temperature gradient takes place in the radial direction of the data recording medium concurrently with heat accumulation in the substrate. Consequently, a deformation of the groove takes place unbalancedly between the inner slant surface and the outer slant surface of the groove to be a cause of tracking offset. This problem is caused by heat accumulation in the substrate at the time of continuous erase/write operations to the tracks, which becomes more serious as the track pitch is made narrower.

The quantity of tracking offset itself is small to cause less trouble. However, when data erase/write operations are effected on more than several tens of continuous tracks with, for instance, a data regenerating laser power applied to the header section and a data erasing laser power applied only to a data section in the data erasing time, the header section does not change at all, whereas tracking offset occurs only in the data section. Particularly at the point of change between the header section and the data section, radial acceleration in the tracking direction increases to exert a significantly bad influence on the tracking servo.

FIG. 5 shows tracking error signal waveforms obtained in the data regenerating time by effecting a data erasing operation on continuous 300 tracks of a magneto-optical recording medium in which the dielectric film 2 has a film thickness of 80 nm at a wavelength of 780 nm of erasing laser beam and repeating operation many times. The recording medium used has a spiral groove directed from an inner periphery to an outer periphery having a track pitch of 1.6 μm, and a data erasing operation was effected on 300 tracks continuing from the inner periphery to the outer periphery.

Referring to FIG. 5, A1 denotes a tracking error signal waveform obtained in an initial data reading stage, A2 represents a tracking error signal waveform obtained in the data reading stage after one time of data erasing operation, A3 represents a tracking error signal waveform obtained in the data reading stage after 10 times of data erasing operations, A4 represents a tracking error signal waveform obtained in the data reading stage after 100 times of data erasing operations, A5 represents a tracking error signal waveform obtained in the data reading stage after 1,000 times of data erasing operations, A6 represents a tracking error signal obtained in the data reading stage after 10,000 times of data erasing operations, and A7 represents a laser drive signal waveform obtained in the data erasing stage where the high level is the normal data erasing power of 8 mW and the low level is the normal data reading power of 1.5 mW.

As is evident from FIG. 5, the tracking is deviated inward at the time of turning on the data erasing power, and the tracking is deviated outward at the time of turning off the data erasing power, for which reason the tracking servo control is unstable. The above is because more severe deformation takes place on the inner slant surface then the outer slant surface of the groove when the data erasing operation is repetitively effected on continuous 300 tracks more than 1,000 times, and therefore an inward tracking offset occurs at the portion to which the high data erasing laser power is applied.

The above-mentioned problems occurs because the film thickness of the dielectric film 2 having a heat insulation effect between the substrate and the magneto-optical film is set at around λ/4n and the film thickness is reduced when the film comprises zinc sulfide, selenium sulfide, or the like having a high refractive index as a main ingredient, which results in reducing the heat insulation effect between the substrate and the magneto-optical film.

SUMMARY OF THE INVENTION

Accordingly, an essential objective of the present invention is to provide a magneto-optical recording medium of which groove does not deform even when several tens of continuous tracks are subjected to repetitive data erase/write operations.

In order to give solution to the above-mentioned problems, it is easy to estimate that the heat insulation effect between the substrate 1 and the magneto-optical film 3 can be exalted by increasing the film thickness of the dielectric film 2. However, the above measure deviates from the enhancement condition of the rotatory polarization angle (Kerr rotation angle) produced by the magneto-optical thin film 3, which also results in a reduction in intensity of the regeneration signal. Furthermore, the reflectance increases to consequently cause an increase of noise and many other disadvantages.

In order to solve the above-mentioned problems, the present invention provides a magneto-optical recording medium comprising between a plastic substrate having a tracking guide groove and a magneto-optical thin film layer a construction in which (1) a first dielectric layer and a second dielectric layer are laminated (2) the first dielectric layer provided on the side of the substrate has the same low refractive index as that of the substrate (3) the second dielectric layer provided on the side of the magneto-optical thin film layer has a high refractive index and a film thickness of λ/4n, and (4) the first dielectric layer and the second dielectric layer have a total film thickness not smaller than 90 nm.

The above-mentioned arrangement means that substantially the first dielectric layer does not exist optically and the required enhancement condition can be satisfied only by the operation of the second dielectric layer. Meanwhile, the integrated body of the first dielectric layer and the second dielectric layer operates as a heat insulation layer.

The present invention having the above-mentioned construction can enhance the heat insulation effect between the magneto-optical thin film layer and the substrate without impairing the enhancement effect. Therefore, by suppressing the increase in temperature of the substrate, the groove does not deform even when data erase/write operations are repetitively effected on several tens tracks in continuation.

In the above case, the first dielectric layer is required to be a transparent dielectric film having approximately the same refractive index as that of the plastic substrate. The plastic substrate is made of a material such as polycarbonate (refractive index: 1.58), olefine based resin (refractive index: 1.53), or PMMA (refractive index: 1.49). Therefore, the first dielectric film is preferably made of a material such as $SiO_2$ (refractive index: 1.5), MgO (refractive index: 1.7), or BeO (refractive index: 1.7). Other effective materials for the film includes a mixture of: one of MgO, BeO, and $Al_2O_3$ (refractive index: 1.8); and $Si_2$ such as $2MgO.SiO_2$ (refractive index: 1.6) and $3Al_2O_3.2SiO_2$ (refractive index: 1.7). It is further effective to mix a material having a high refractive index and a material having a low refractive index at an appropriate ratio to achieve a total refractive index of 1.4 to 1.7.

The second dielectric film is required to be a transparent body having a high refractive index in order to exalt the enhancement effect. The second dielectric film can be made of silicon nitride, aluminum nitride, zinc sulfide, zinc selenic (ZnSe), selenium sulfide, tantalum oxide, or a mixture of any of the materials and silicon oxide having a refractive index of 1.9 to 2.3, these materials having been conventionally used as a dielectric material for the enhancement effect. Assuming that the wavelength of laser beam used for data recording and erasing is λ and the refractive index of the second dielectric film is n, the film thickness of the dielectric film 2 is set at around λ/4n. In more detail, the film thickness is preferably within a range of from a lower limit of λ/6.4n at which the refractive index takes its minimum value to an upper limit of λ/3.9n.

On the other hand, the magneto-optical film to be layered on the second dielectric film and a film to be further layered on the resulting laminate is able to have the conventional constructions without modification.

It is noted that the present invention is very effective for a recording medium in which the rotatory polarization angle (Kerr rotation angle) of the magneto-optical film is enhanced by the second dielectric film. However, applications of the advantages of the present invention is not limited to the magneto-optical recording medium, and it is effective for any optical recording medium capable of rewriting data except for read-only optical recording media exclusive for data reading.

The above is because the film thickness of the dielectric film 2 is normally set at around λ/4n to provide the effect of reducing the quantity of reflection light and increasing absorption energy for the purpose of reducing the laser power required for data recording or erasing on an optical recording medium subject to data recording by the user. Therefore, in order to improve the sensitivity, the dielectric film 2 has a smaller thickness according as the laser used for data recording and erasing has a shorter wavelength. The above fact is the same as in the magneto-optical recording medium, which means that the present invention can be applied to the other optical recording media capable of rewriting data.

BRIEF DESCRIPTION OF THE DRAWINGS

These and other objects and features of the present invention will become apparent from the following description taken in conjunction with the preferred embodiment thereof with reference to the accompanying drawings, in which:

FIGS. 6(a) and 6(b) are schematic diagrams each showing an architecture of producing a magneto-optical recording medium in accordance with the present invention;

DETAILED DESCRIPTION OF THE PREFERRED EMBODIMENTS

The following describes an embodiment of the present invention with reference to the attached drawings.

Figure 1:
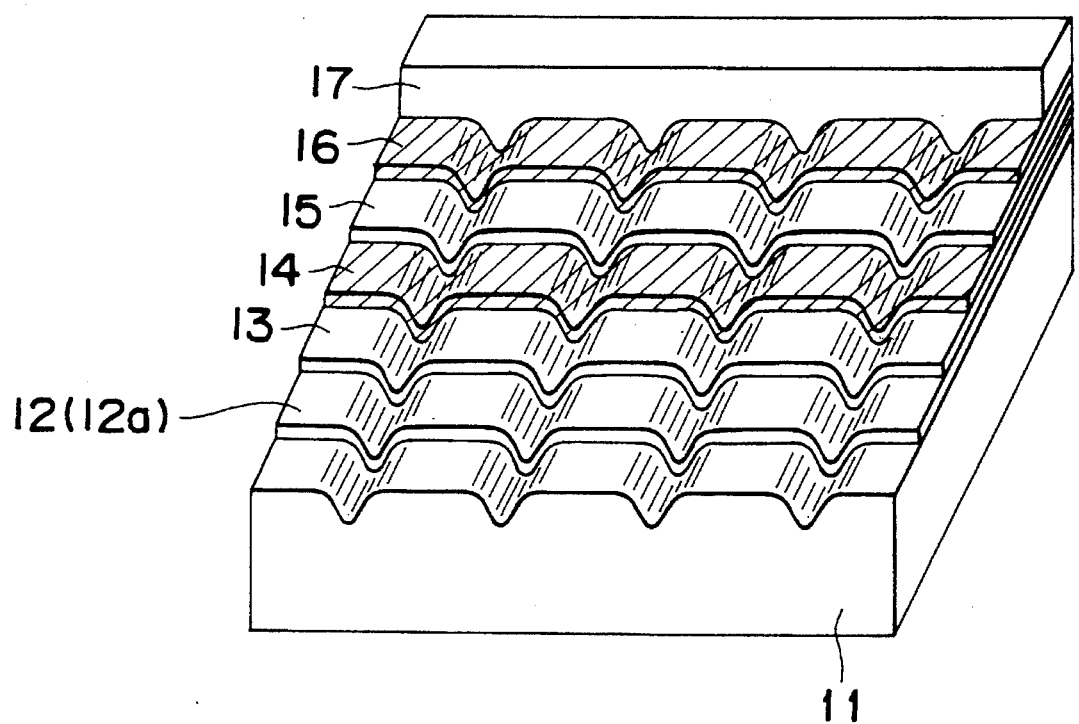
FIG. 1 is a schematic view of a magneto-optical recording medium in accordance with a first embodiment of the present invention.

FIG. 1 shows the construction of a magneto-optical recording medium in accordance with a first embodiment of the present invention. Referring to FIG. 1, the reference numeral 11 denotes a polycarbonate substrate provided with a tracking guide groove spirally ranging from a 23-mm radius position to a 41-mm radius position at a track pitch of 1.6 μm. The reference numeral 12 denotes a first dielectric film made of silicon dioxide having a film thickness of 20 nm. The reference numeral 13 denotes a second dielectric film made of zinc sulfide having a film thickness of 80 nm. The reference numeral 14 denotes a magneto-optical film made of TbFeCo having a thickness of 35 nm. The reference numeral 15 denotes an intermediate layer made of zinc sulfide having a thickness of 20 nm. The reference numeral 16 denotes a reflection film made of aluminum having a thickness of 50 nm. The reference numeral 17 denotes a protection layer. The construction of the present embodiment differs from the conventional construction in that the dielectric film 12 which is made of silicon dioxide and has approximately the same refractive index as that of the polycarbonate substrate is interposed between the dielectric film 13 made of zinc sulfide having the enhancement effect and the polycarbonate substrate 11.

The layers are each deposited by sputtering. FIG. 6(a) shows an architecture of producing a magneto-optical recording medium. The following describes magneto-optical recording medium producing processes by means of the architecture.

(1) A plastic substrate is set in a loading chamber 601. After evacuation and discharge of air to achieve a specified pressure (not greater than 3×10$^{-4}$ pascal), a substrate is transferred to a first pressure adjusting chamber 602. Subsequently, dry nitrogen gas is introduced as a leakage gas X into the loading chamber 601 to restore an atmospheric pressure, and then the next substrate is loaded.

(2) To the first pressure adjusting chamber 602, the substrate is transferred from the loading chamber 601, and argon gas is introduced as a sputtering gas A to increase the internal pressure from the vacuum condition to a pressure equal to a gaseous pressure (0.5 pascal) of a first sputtering chamber 603a. Subsequently, the substrate is transferred to the first sputtering chamber 603a.

(3) To the first sputtering chamber 603a, the substrate is transferred from the first pressure adjusting chamber 602 in condition where the argon gas is introduced as the sputtering gas A into the chamber 603a. Subsequently, a sputtering process is effected using a first target 604a composed of silicon dioxide, and then a sputtering process is effected using a second target 607a composed of zinc sulfide to form two layers of first and second dielectric films 12 and 13. Subsequently, the substrate is transferred to a third pressure adjusting chamber 608.

(4) To the third pressure adjusting chamber 608, argon gas is introduced as the sputtering gas A to achieve a gaseous pressure (0.5 pascal) of the first sputtering chamber 603a, in which condition the substrate is transferred from the first sputtering chamber 603a. Subsequently, the introduction amount of the sputtering gas A is adjusted to change the gaseous pressure from the gaseous pressure of the first sputtering chamber 603a to the gaseous pressure (0.8 pascal) of a third sputtering chamber 609. Subsequently, the substrate is transferred to the third sputtering chamber 609.

(5) To the third sputtering chamber 609, the substrate is transferred from the third pressure adjusting chamber 608 in condition where argon gas is introduced as the sputtering gas A, and then a sputtering process is effected using a third target 610 composed of TbFeCo to deposit a magneto-optical layer 14. Subsequently, the substrate is transferred to a fourth pressure adjusting chamber 611.

(6) To the fourth pressure adjusting chamber 611, argon gas is introduced as the sputtering gas A to achieve the same gaseous pressure as in the third sputtering chamber 609, in which condition the substrate is transferred from the third sputtering chamber 609. Subsequently, the introduction amount of the sputtering gas A is adjusted to increase the gaseous pressure from the gaseous pressure of the third sputtering chamber 609 to the gaseous pressure (0.5 pascal) of a fourth sputtering chamber 612. Subsequently, the substrate is transferred to the fourth sputtering chamber 612.

(7) To the fourth sputtering chamber 612, the substrate is transferred from the fourth pressure adjusting chamber 611 in condition where argon gas is introduced as the sputtering gas A, and then a sputtering process is effected using a fourth target 613 composed of zinc sulfide to deposit an intermediate layer 15. Subsequently, the substrate is transferred to a fifth pressure adjusting chamber 614.

(8) To the fifth pressure adjusting chamber 614, argon gas is introduced as the sputtering gas A to achieve the same gaseous pressure as in the fourth sputtering chamber 612, in which condition the substrate is transferred from the fourth sputtering chamber 612. Subsequently, the introduction amount of the sputtering gas A is adjusted to change the gaseous pressure from the gaseous pressure of the fourth sputtering chamber 612 to the gaseous pressure (0.3 pascal) of a fifth sputtering chamber 615. Subsequently, the substrate is transferred to the fifth sputtering chamber 615.

(9) To the fifth sputtering chamber 615, the substrate is transferred from the fifth pressure adjusting chamber 614 in condition where argon gas is introduced as the sputtering gas A, and then a sputtering process is effected using a fifth target 616 composed of aluminum to deposit a reflection layer 16. Subsequently, the substrate is transferred to a sixth pressure adjusting chamber 617.

(10) To the sixth pressure adjusting chamber 617, argon gas is introduced as the sputtering gas A to achieve the same gaseous pressure as in the fifth sputtering chamber 615, in which condition the substrate is transferred from the fifth sputtering chamber 615. Subsequently, introduction of the sputtering gas A is interrupted. After achieving a high vacuum condition, the substrate is transferred to an unloading chamber 618.

(11) To the unloading chamber 618, the substrate is transferred from the sixth pressure adjusting chamber 617, and then dry nitrogen gas is introduced as the leakage gas X to achieve an atmospheric pressure. Subsequently, the substrate which has been completely deposited with films is taken out.

As described above, only argon gas is required to be used in the sputtering processes by using a compound target as the first and second dielectric films to be layered on the substrate. As a result, the first dielectric film and the second dielectric film can be successively layered in an identical sputtering chamber.

Then the following describes the operation of the magneto-optical recording medium thus produced.

Since the refractive index of 1.5 of the first dielectric film 12 is approximately the same as the refractive index of 1.58 of the substrate 11, almost no reflection occurs at the boundary surface between the dielectric film 12 and the substrate 11. Therefore, the firs dielectric film 12 can be regarded optically as a part of the substrate 11 regardless of its film thickness. In other words, the dielectric film 12 is practically nothing optically, and therefore the dielectric film 13 is allowed to have the enhancement effect at a film thickness of $\lambda/4n$ in the same manner as in the conventional setting. Meanwhile, when the magneto-optical film 14 is heated by the laser beam in the data erasing or recording time, the first dielectric film 12 and the second dielectric film 13 function as an integrated body to produce a heat insulation effect between the substrate 11 and the magneto-optical film 14. Therefore, the heat insulation effect between the substrate 11 and the magneto-optical film 14 can be exalted.

In other words, by virtue of the provision of the dielectric film 12 having approximately the same refractive index as that of the substrate 11, the heat insulation effect between the substrate 11 and the magneto-optical film 14 can be exalted thermally while optically keeping the conventional enhancement effect.

Figure 12:
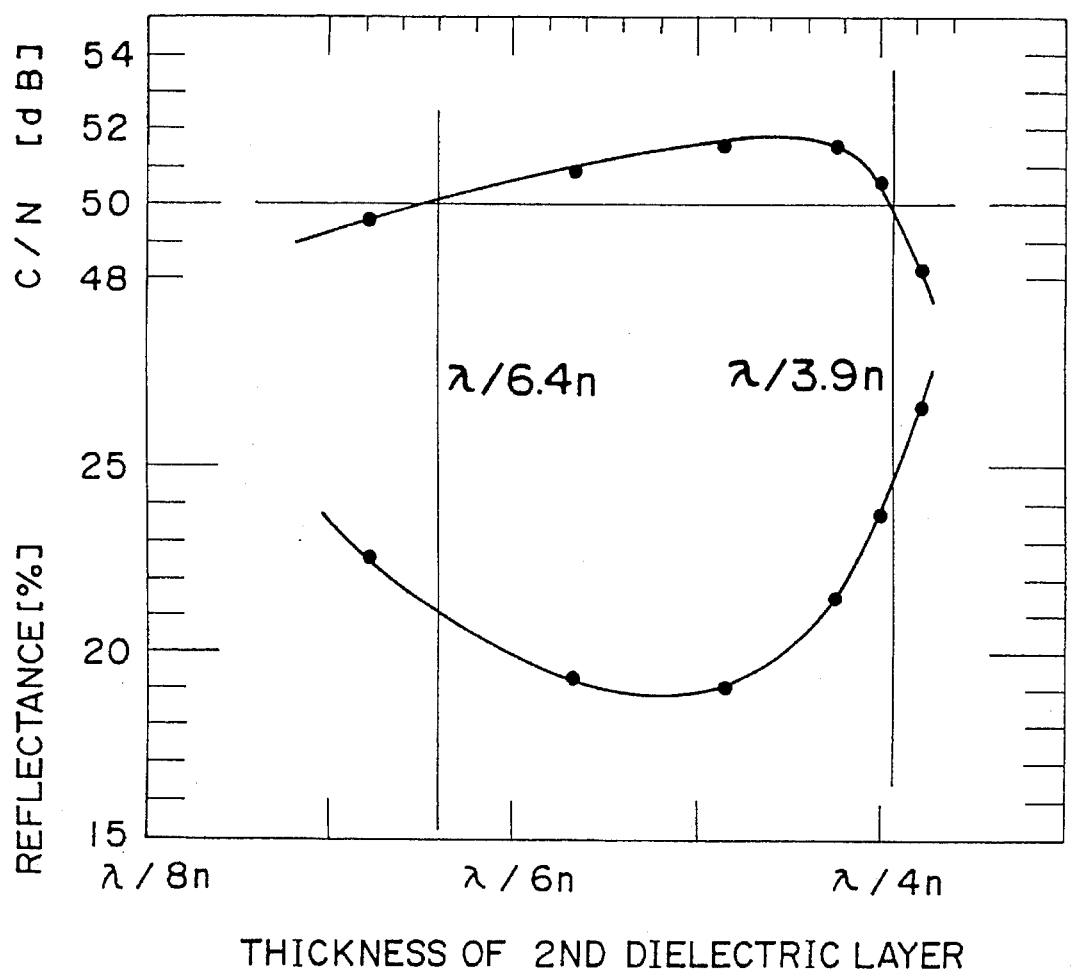
FIG. 12 is a graph showing tolerances of the film thickness of the second dielectric film.

FIG. 12 shows a relation between the thickness, reflectance, and C/N of the second dielectric film. It is noted that the recording mark length in measuring C/N is equal to the wavelength at reading. In order to assure a stable signal quality, a C/N of 50 dB or more is necessary. In order to execute data recording and erasing with high sensitivity, the reflectance is required to be suppressed low. To achieve the above, it is preferred that the film thickness of the second dielectric film 13 is not smaller than $\lambda/6.4n$ and not greater than $\lambda/3.9n$, as apparent from FIG. 12.

To achieve the above, when the same dielectric material having a refractive index of 2.3 as in the present embodiment is used as the second dielectric layer 13, it is preferred to satisfy the following conditions:

(1) the second dielectric film has a film thickness of 53 to 87 nm when using a laser beam wavelength of 780 nm in a read/write/erase operation;

(2) the second dielectric film has a film thickness of 46 to 76 nm when using a laser beam wavelength of 680 nm in a read/write/erase operation;

(3) the second dielectric film has a film thickness of 36 to 59 nm when using a laser beam wavelength of 532 nm in a read/write/erase operation; and (4) the second dielectric film has a film thickness of 33 to 54 nm when using a laser beam wavelength of 488 nm in a read/write/erase operation.

In regard to the above tolerance of the film thickness of the second dielectric film, a film thickness of 80 nm is selected for the read/write/erase laser beam wavelength of 780 nm in the present case.

The magneto-optical recording medium having the above-mentioned construction was subjected to measurement of its reflectance and Kerr rotation angle. The results are shown in the following table together with those of a recording medium having the conventional construction. It is noted that the recording medium having the conventional construction is not provided with the dielectric film 12 of the present embodiment, and therefore the other factors except for the above film arrangement are made same as those of the present embodiment.

|  | Recording medium of the embodiment | Conventional recording medium |
| --- | --- | --- |
| Reflectance | 21.2% | 21.0% |
| Kerr rotation angle | 0.75° | 0.76° |

As is evident from the above table, the values of the reflectance and the Kerr rotation angle are almost the same as those of the conventional recording medium since the refractive index of the first dielectric film 12 is very close to the refractive index of the substrate 11 in the case of the present embodiment. The above fact reveals that the provision of the first dielectric film 12 exerts almost no optical influence, and therefore the enhancement effect produced by the second dielectric film 13 is maintained as it is.

Figure 7A:
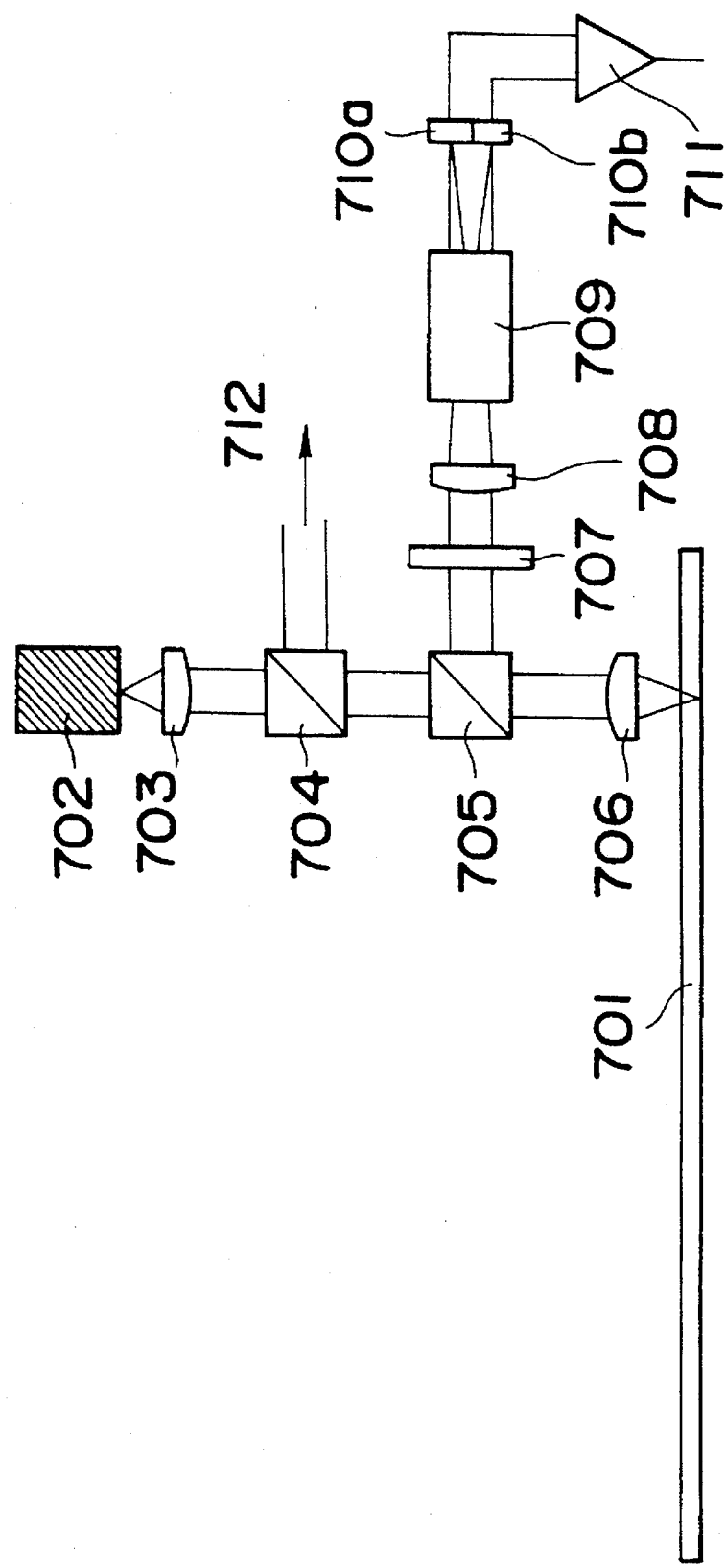
FIGS. 7(a) and 7(b) are schematic diagrams of a data read/write/erase apparatus using a magneto-optical recording medium of the present invention.

Then data recording, reading, and erasing operations were effected on the magneto-optical recording medium of the present embodiment by means of a data read/write/erase apparatus as shown in FIG. 7(a). Referring to FIG. 7(a), the reference numeral 701 denotes the recording medium of the present embodiment which moves at a velocity of 7.5 m/s with respect to a beam spot position. The following describes the data read/write/erase operations with reference to FIG. 7(a).

(1) Erasing operation

Normally, a data erasing operation is effected on a position onto which data is to be recorded before the data recording. A laser beam emitted from a laser beam source 702 having a wavelength of 780 nm is converged on the magneto-optical recording medium 701 by way of a collimator lens 703, a first beam splitter 704, a second beam splitter 705, and an objective lens 706. In the above case, a laser beam having a sufficiently great erasing power (8 mW) is applied to the signal already recorded so that no data remain unerased. Furthermore, a magnetic field in a specified direction is exerted by a bias magnetic field unit 712, and therefore the portion of the magneto-optical film to which the erasing-power beam is applied is magnetically oriented in a specified direction. In order to increase the sensitivity of the recording medium as much as possible to allow the data erasing operation to be achieved at a low laser intensity in the above case, the film thickness of the second dielectric film 13 is required to be at around λ/4n.

(2) Writing operation

In a data recording operation, the beam emitted from the laser beam source 702 having a laser beam wavelength of 780 nm is modulated in a range between high power and low power levels in accordance with a signal to be recorded. The modulated laser beam is converged on the magneto-optical recording medium 701 by way of the collimator lens 703, first beam splitter 704, second beam splitter 705, and objective lens 706. In the above case, a portion of the magneto-optical film to which the high-power beam is applied is magnetically oriented in a direction reverse to the direction in the data erasing condition because a magnetic field in a specified direction reverse to the direction in the data erasing stage is exerted from the bias magnetic field unit 712. In order to increase the sensitivity of the recording medium as much as possible to allow data recording to be achieved at a low laser intensity in the above case, the film thickness of the second dielectric film is also required to be at around λ/4n.

(3) Reading operation

In a data reading operation, the laser beam source 702 having a laser beam wavelength of 780 nm emits a laser beam at an intensity lower than that in the data recording or erasing stage. The laser beam is converged on the magneto-optical recording medium 701 by way of the collimator lens 703, first beam splitter 704, second beam splitter 705, and objective lens 706. Reflected laser beam rotates its plane of linear polarization reversely according to the magnetic orientation direction of the recording medium 701. The reflected laser beam is split from its going path by the second beam splitter 705 to travel through a half-wavelength plate 707 and a convergence lens 708. The rotation of linear polarization plane is converted into a variance in intensity of light by an analyzer 709, and then guided to detectors 710a and 710b to be taken out as a signal by way of a differential detector 711. Since the quantity of rotation in angle of the plane of polarization is very small in the above case, it is necessary to set the film thickness of the second dielectric film at around λ/4n to enhance the quantity of rotation in angle of the plane of polarization by taking advantage of a multiple reflection effect.

Figure 5:
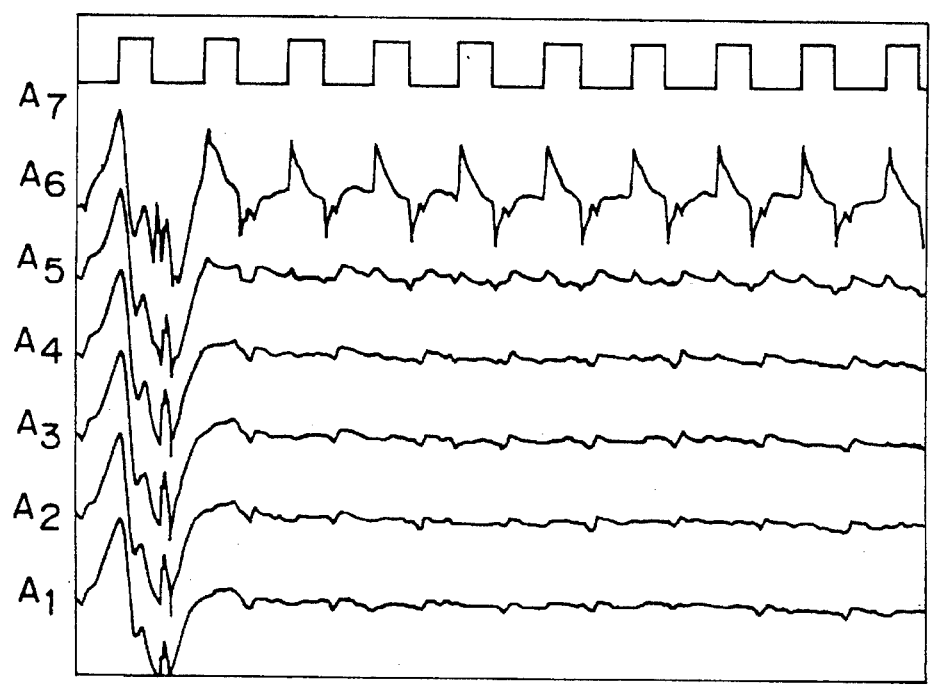
FIG. 5 is a graph showing tracking error signals obtained after repetitive data erasing operations effected on continuous tracks of the conventional magneto-optical recording medium.

Subsequently, continuous 300 tracks commencing from a 24-mm radius position on the magneto-optical recording medium of the present invention were subjected to a data erasing operation at the same laser intensity as shown in FIG. 5. The continuous 300 tracks were further subjected to a data recording operation and then to a data reading operation. The above-mentioned sequence of operations were repeated 5,000 times. The resulting tracking error signal in the data regeneration stage is shown by a waveform D in FIG. 2. It is noted that a waveform E shown in FIG. 2 for comparison is a tracking error signal in the data regeneration stage obtained after effecting data erasing, recording, and reading operations on 300 continuous tracks of the conventional magneto-optical recording medium (having a construction as shown in FIG. 3) and repeating the operations for 5,000 times.

Figure 2:
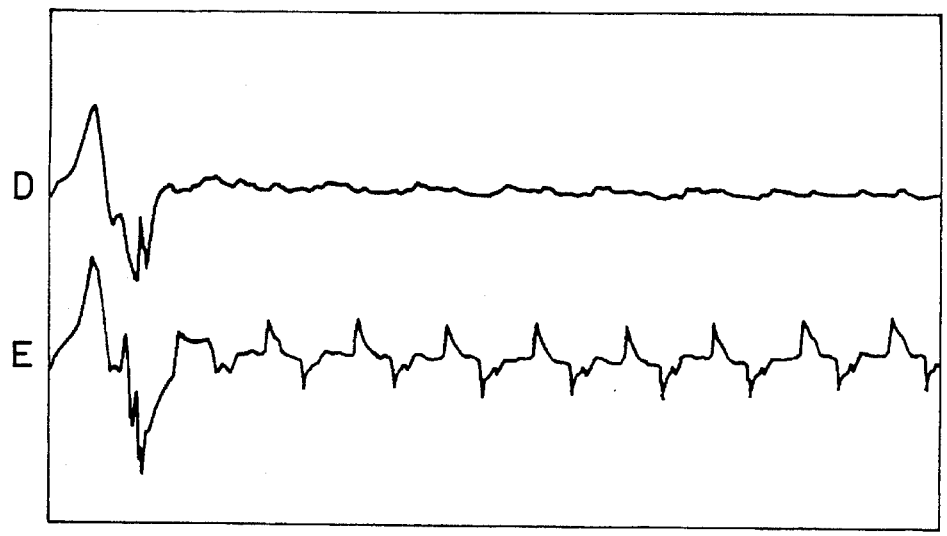
FIG. 2 is a graph showing tracking error signals obtained after repetitive data erasing operations effected on continuous tracks of the magneto-optical recording medium of the first embodiment of the present invention.
Figure 3:
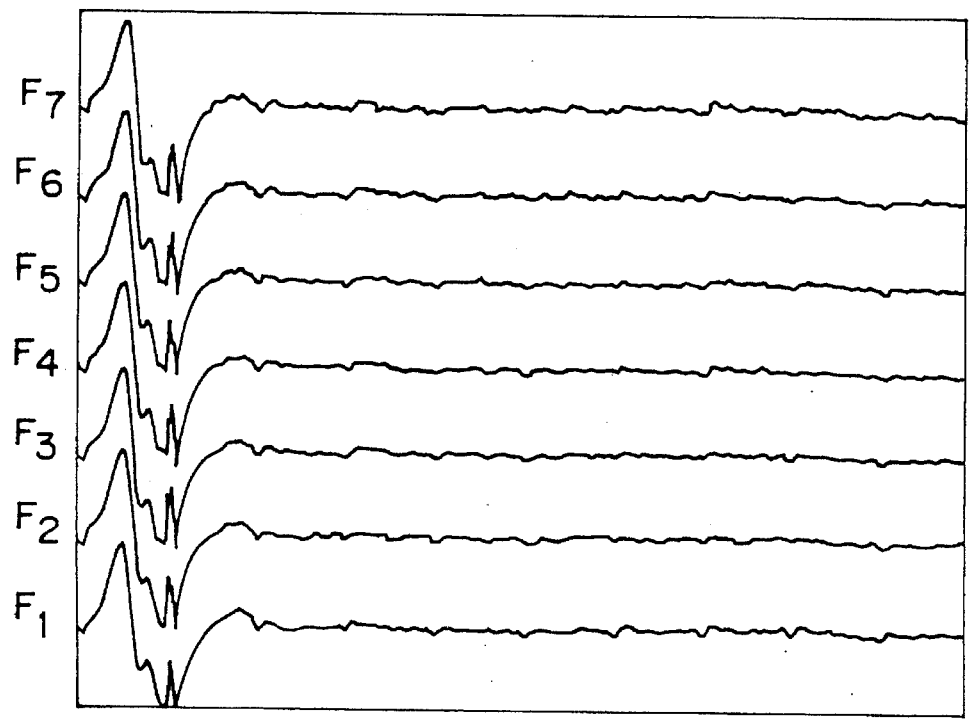
FIG. 3 is a graph showing tracking error signals obtained after repetitive data erasing operations effected on continuous tracks of the magneto-optical recording medium in accordance with a second embodiment of the present invention.
Figure 4:
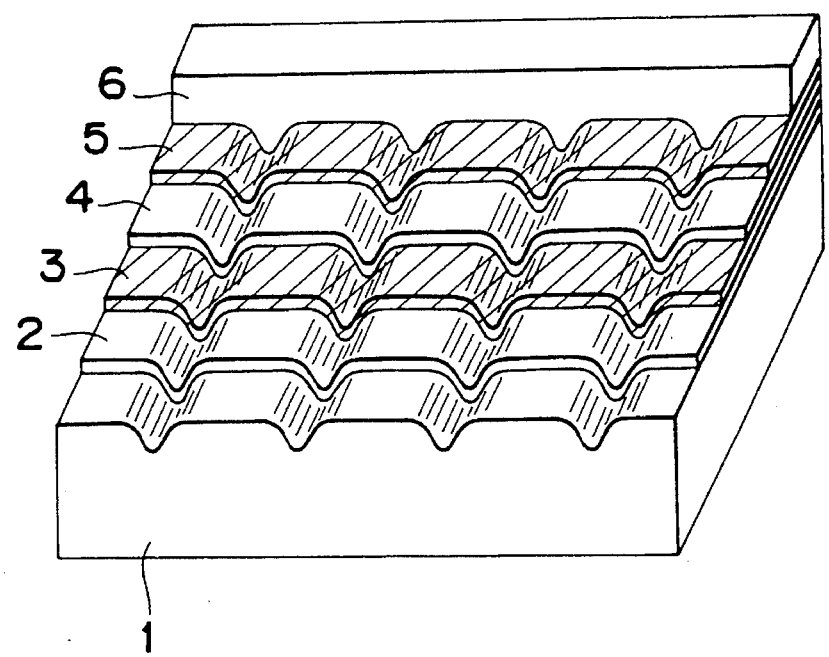
FIG. 4 is a schematic view of a conventional magneto-optical recording medium.

As is evident from FIG. 2, a deviation of tracking takes place in the case where 5,000 times of repetitive data erasing operations on the continuous tracks of the conventional magneto-optical recording medium, whereas no deviation of tracking takes place on the recording medium of the present invention.

SECOND EMBODIMENT

The following describes a second embodiment of the present invention.

Except that the first dielectric film is composed of 2MgO-.SiO$_2$ having a thickness of 50 nm (refractive index: 1.6), the same recording medium as in the first embodiment was used. The recording medium was produced in the same manner as in the first embodiment by means of the same recording medium producing process as shown in FIG. 6(a) except that the material of the first target 604a was changed from silicon dioxide to 2MgO.SiO$_2$.

In the present case, the refractive index (1.58) of the substrate and the refractive index (1.6) of the first dielectric film are very close to each other, and therefore almost no reflection takes place at the boundary surface. In other words, by providing the dielectric film 12 having the same refractive index as that of the substrate 11, the heat insulation effect between the magneto-optical film 14 and the substrate 11 can be exalted thermally while optically maintaining the conventional enhancement effect.

The magneto-optical recording medium having the above-mentioned construction was first subjected to measurement of its reflectance and Kerr rotation angle in the same manner as in the first embodiment. The results are shown in the following table together with those of a recording medium having the conventional construction. It is noted that the recording medium having the conventional construction is not provided with the dielectric film 12 of the present embodiment, and therefore the other factors except for the above film arrangement are made same as those of the present embodiment.

|  | Recording medium of second embodiment | Conventional recording medium |
| --- | --- | --- |
| Reflectance | 21.0% | 21.0% |
| Kerr rotation angle | 0.75° | 0.76° |

As is evident from the above table, since the refractive index of the first dielectric film 12 is very close to the refractive index of the substrate 11, the values of the reflectance and the Kerr rotation angle are almost the same as those of the conventional recording medium in the second embodiment. The above fact reveals that the provision of the first dielectric film 12 exerts almost no optical influence, and therefore the enhancement effect produced by the second dielectric film 13 is maintained as it is.

Then data read/write operations were effected on the magneto-optical recording medium of the present embodiment by means of a data read/write/erase apparatus as shown in FIG. 7(a) in the same manner as in the first embodiment. Continuous 300 tracks commencing from the 24-mm radius position were subjected to a data erasing operation at the same laser intensity as shown in FIG. 5. The continuous 300 tracks were further subjected to a data recording operation and then to a data reading operation. The above-mentioned sequence of operations were repeated $10^5$ times. The resulting tracking error signal in the data regeneration stage is shown in FIG. 3. Referring to FIG. 3, F1 represents a tracking error signal waveform in an initial data reading stage. F2 represents a tracking error signal waveform in a data reading stage after executing one time of data erasing operation. F3 represents a tracking error signal in a data reading stage after executing 10 times of data erasing operations. F4 represents a tracking error signal in a data reading stage after executing 100 times of data erasing operations. F5 represents a tracking error signal in a data reading stage after executing $10^3$ times of data erasing operations. F6 represents a tracking error signal in a data reading stage after executing $10^4$ times of data erasing operations. F7 represents a tracking error signal in a data reading stage after executing $10^5$ times of data erasing operations. It is noted that the laser drive signal waveform is the same as employed in the time of measuring the conventional example as shown in FIG. 5.

As is evident from FIG. 3, a deviation of tracking takes place in the case where $10^5$ times of data erasing operations are effected on the continuous tracks of the conventional magneto-optical recording medium, whereas no deviation of tracking takes place on the recording medium of the present invention.

According to the present embodiment as described above, by providing the dielectric film 12 having the same refractive index as that of the substrate 11 in between the substrate 11 and the second dielectric film 13 having the enhancement effect, possible deterioration of the substrate can be suppressed in the case where data erasing, recording, and reading operations are repetitively effected on continuous tracks while optically maintaining the conventional enhancement effect.

The present invention is effective for the reason that the second dielectric film 13 has a thin film thickness of 53 to 87 nm when the second dielectric film has a refractive index of 2.2 to 2.3 even when the laser beam wavelength of 780 nm is used for the data read/write/erase operations.

In the above case, the first dielectric film 12 exerts its effect of suppressing the damage of the substrate due to the repetitive data erasing operation on the continuous tracks even when it has a thin film thickness of about 20 nm as shown in the first embodiment. The above-mentioned effect is made greater according as the film thickness of the dielectric film 12 increases. However, when the dielectric film 12 has an excessively great film thickness, the dielectric film 12 is not appropriate because it causes peeling-off or cracks of the film. Normally, the upper limit of the film thickness is 200 to 500 nm.

The first dielectric film 12 is effective either in the case where it is made of SiO$_2$ in the same manner as in the first embodiment or in the case where it is made of 2MgO.SiO$_2$ in the same manner as in the second embodiment. Therefore, it can be considered that the first dielectric film 12 is effective in the range of: $(MgO)_x(SiO_2)_{1-x}$ where $0 \leq x \leq 0.67$.

THIRD EMBODIMENT

According to a third embodiment, different compounds of 2MgO.SiO$_2$ and ZnS.SiO$_2$ are employed in an identical chamber at a laser beam wavelength of 680 nm or less.

The following describes the third embodiment of the present invention.

Except that the second dielectric film is composed of ZnS.SiO$_2$ (refractive index: 2.0) having various thicknesses, the same recording media as in the second embodiment were used. The present recording media were produced in the same manner as in the first embodiment by means of the same recording medium producing process as shown in FIG. 6(a) except that the material of the first target 604a was changed to 2MgO.SiO$_2$ and the second target 607a was changed to ZnS.SiO$_2$. It is noted that the substrates employed in the present recording media were three types, first substrate having a track pitch of 1.4 μm, second of 1.3 μm and third of 0.9 μm.

FIG. 12 shows a relation between the thickness, reflectance, and C/N of the second dielectric film. It is noted that the recording mark length in measuring C/N is equal to the wavelength at reading. In order to assure a stable signal quality, a C/N of 50 dB or more is necessary. In order to execute data recording and erasing with high sensitivity, the reflectance is required to be suppressed low. To achieve the above, it is preferred that the film thickness of the second dielectric film 13 is not smaller than λ/6.4n and not greater than λ/3.9n. To achieve the above, when the same dielectric material having a refractive index of 2.0 as in the present embodiment is used, it is preferred to satisfy the following conditions:

(1) the second dielectric film has a film thickness of 61 to 100 nm for laser beam wavelength of 780 nm in read/write/erase operation;

(2) the second dielectric film has a film thickness of 53 to 87 nm for laser beam wavelength of 680 nm in read/write/erase operation;

(3) the second dielectric film has a film thickness of 42 to 68 nm for laser beam wavelength of 532 nm in read/write/erase operation; and (4) the second dielectric film has a film thickness of 38 to 63 nm for laser beam wavelength of 488 nm in read/write/erase operation.

The produced second dielectric films made of ZnS.SiO$_2$ have within the above-mentioned tolerances the following four film thicknesses:

(1) 90 nm for laser beam wavelength of 780 nm (track pitch: 1.4 m) in read/write/erase operation;

(2) 80 nm for laser beam wavelength of 680 nm (track pitch: 1.3 μm) in read/write/erase operation;

(3) 60 nm for laser beam wavelength of 532 nm (track pitch: 0.9 μm) in read/write/erase operation; and (4) 55 nm for laser beam wavelength of 488 nm (track pitch: 0.9 μm) in read/write/erase operation.

Except for the film thickness for the laser beam wavelength of 780 nm, the total film thickness of the first dielectric film 12 and the second dielectric film 13 is set at 90 nm.

In the present case, the refractive index (1.58) of the substrate and the refractive index (1.6) of the first dielectric film are close to each other in the same manner as in the second embodiment, and therefore almost no reflection takes place at the boundary surface. In other words, by providing the first dielectric film 12 having the same refractive index as that of the substrate 11 as well as the second dielectric film 13, the heat insulation effect between the magneto-optical film 14 and the substrate 11 can be exalted thermally while optically maintaining the conventional enhancement effect.

As a data read/write/erase apparatus for each of the recording media, an apparatus obtained by changing the laser beam source 702 of the data read/write/erase apparatus shown in FIG. 7(a) was used. As a laser beam source 702 having either of the wavelengths of 780 nm and 680 nm, a semiconductor laser was used.

Figure 7B:
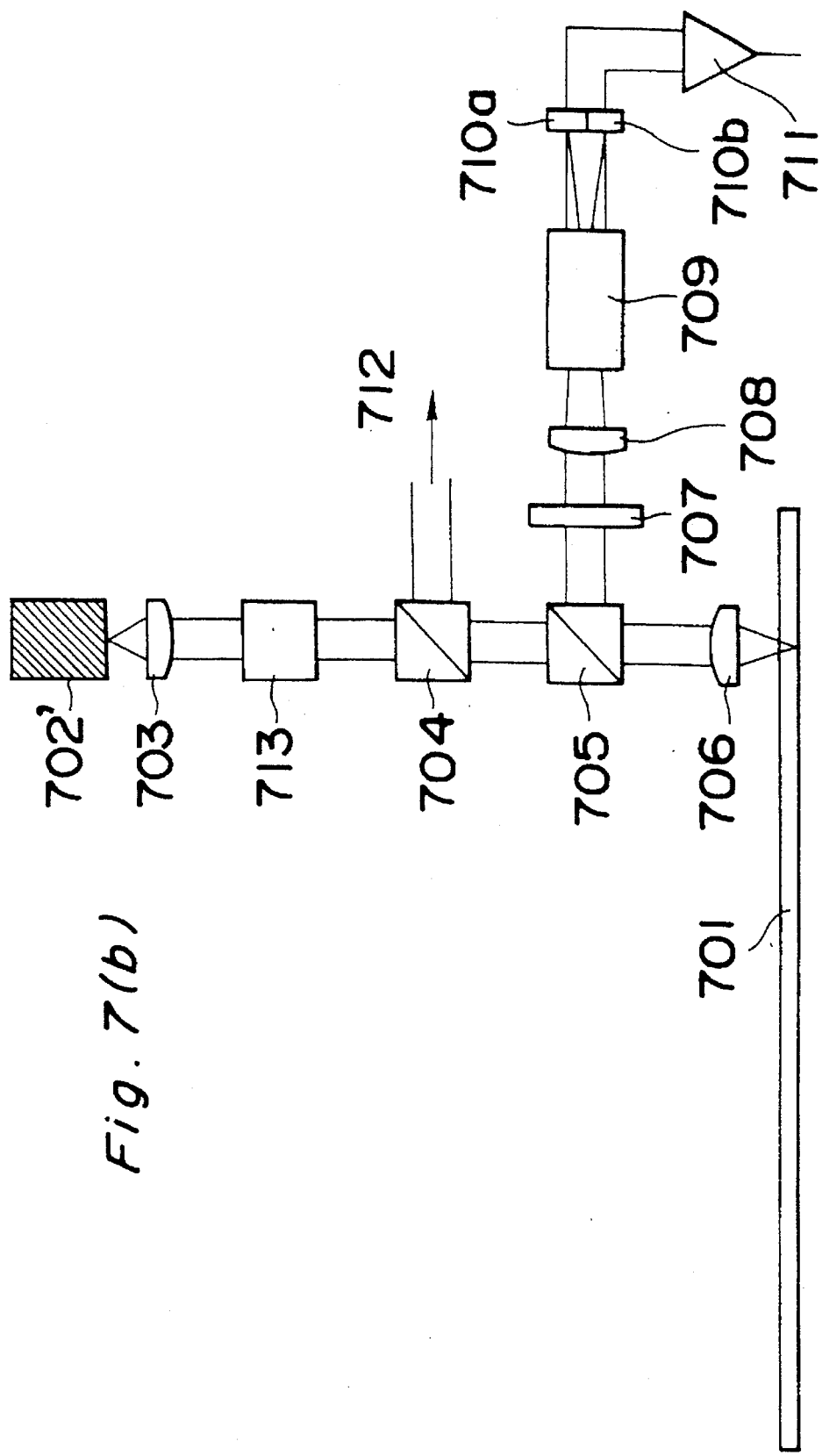

On the other hand, as for the wavelengths of 532 nm and 488 nm, an apparatus is further provided with an EO-modulator 713 for switching the incident laser power as shown in FIG. 7(b), where a laser beam source 702' is used instead of using the laser beam source 702 shown in FIG. 7(a). As a laser beam source 702' having the wavelength of 532 nm, a laser beam source utilizing an SHG output of a YAG laser was used. As a laser beam source 702' having the wavelength of 488 nm, an argon gas laser was used. At each of the wavelengths of 532 nm and 488 nm, a data overwriting operation was executed by the magnetic field modulation method for changing the polarity of the magnetic field exerted from the bias magnetic field unit 712 while continuously applying a laser beam.

First, data read/write operations were effected on a magneto-optical recording medium having no first dielectric film 12 by means of the above-mentioned data read/write/erase apparatuses. With the data read/write/erase apparatus employing a laser beam source having the wavelength of 780 nm or 680 nm, continuous 300 tracks commencing from the 24-mm radius position were subjected to a data erasing operation, and then to a data recording operation. After repeating the above-mentioned operations for $10^4$ times, the tracks were subjected to a data reading operation. With the data read/write/erase apparatus employing a laser beam source having the wavelength of 532 nm or 488 nm, continuous 300 tracks commencing from the 24-mm radius position were subjected to a repetitive data overwriting operation for $10^4$ times, and then to a data reading operation.

As a result, a slight deviation of tracking is observed when the second dielectric film has a film thickness of 92 nm for the data read/write/erase laser beam wavelength of 780 nm. However, it is not on such a level as to cause troubles. In contrast to the above, when the second dielectric film has a film thickness of:

(1) 80 nm for laser beam wavelength of 680 nm (track pitch: 1.3 μm) in read/write/erase operation;

(2) 63 nm for laser beam wavelength of 532 nm (track pitch: 0.9 μm) in read/write/erase operation; and (4) 58 nm for laser beam wavelength of 488 nm (track pitch: 0.9 μm) in read/write/erase operation, a serious deviation of tracking takes place to cause an unstable tracking servo operation, and therefore the film cannot be used.

In contrast to the above, no such significant deviation of tracking as to cause troubles takes place in the case of the present embodiment in which the first dielectric film 12 made of 2MgO.SiO$_2$ and the second dielectric film 13 made of ZnS.SiO$_2$ are provided, and the total film thickness of the first dielectric film 12 and the second dielectric film 13 is set at 90 nm.

According to the above-mentioned results, the second dielectric film is required to have a film thickness being not greater than 80 nm at the laser beam wavelength of 680 nm when the second dielectric film has a refractive index of 2.0, which reveals that the present invention is particularly effective in the above-mentioned condition.

FOURTH EMBODIMENT

The following describes a fourth embodiment of the present invention.

The first dielectric film 12 as shown in FIG. 1 was composed of silicon dioxide, while the second dielectric film 13 was composed of tantalum pentoxide (refractive index: 2.0). The construction of the present embodiment is achieved by a magneto-optical recording medium producing process as shown in FIG. 6(b). The following describes magneto-optical recording medium producing processes by means of the above-mentioned apparatus.

(1) A plastic substrate is set in a loading chamber 601. After evacuation and discharge of air to achieve a specified pressure (not greater than $3 \times 10^{-4}$ pascal), a substrate is transferred to a first pressure adjusting chamber 602. Subsequently, dry nitrogen gas is introduced as a leakage gas X into the loading chamber 601 to restore an atmospheric pressure, and then the next substrate is loaded.

(2) To the first pressure adjusting chamber 602, the substrate is transferred from the loading chamber 601, and mixed gas composed of argon gas serving as a sputtering gas A and oxygen gas serving as a reactive gas B is introduced to increase the internal pressure from the vacuum condition to a pressure equal to a gaseous pressure (0.5 pascal) of a first sputtering chamber 603b. Subsequently, the substrate is transferred to a first sputtering chamber 603b.

(3) In the first sputtering chamber 603b, there was already introduced the mixed gas composed of argon gas serving as the sputtering gas A and oxygen gas serving as the reactive gas B. After the substrate is transferred from the pressure adjusting chamber 602, a silicon dioxide film is formed through reactive sputtering in a first target 604b composed of silicon, and then a tantalum pentoxide film is formed through reactive sputtering in a second target 607b composed of tantalum. Subsequently, the substrate is transferred to a third pressure adjusting chamber 608.

(4) To the third pressure adjusting chamber 608, the mixed gas composed of argon gas serving as a sputtering gas A and oxygen gas serving as reactive gas B is introduced to achieve a gaseous pressure (0.5 pascal) of the first sputtering chamber 603b, in which condition the substrate is transferred from the first sputtering chamber 603b. Subsequently, supply of the oxygen gas serving as the reactive gas B is stopped, and the introduction amount of the sputtering gas A is adjusted until the same gaseous environment as in the first sputtering chamber 603b is made equal to the gaseous pressure (0.8 pascal) of the third sputtering chamber 609. Subsequently, the substrate is transferred to the third sputtering chamber 609.

Subsequent processes are the same as in the first embodiment. Generally, when producing a metal compound thin film, it is more advantageous to introduce reactive gas while effecting DC sputtering by means of a metal target to form the metal compound thin film than effect sputtering by means of a metal compound target in order to achieve a rapid film formation speed. As described above, by using a metal oxide having a refractive index of about 1.5 as the first dielectric film and using a metal oxide of another kind having a refractive index of about 2.0 as the second dielectric film, same oxygen gas can be used as the reactive gas. Therefore, the target for producing the first dielectric film and the target for producing the second dielectric film can be arranged in an identical chamber to allow the recording medium producing apparatus to be simplified.

In the same manner as in the third embodiment, the thus-produced second dielectric films 13 made of tantalum pentoxide have the following three film thicknesses:

(1) 80 nm for laser beam wavelength of 680 nm (track pitch: 1.3 μm) in read/write/erase operation;
(2) 60 nm for laser beam wavelength of 532 nm (track pitch: 0.9 μm) in read/write/erase operation; and
(3) 55 nm for laser beam wavelength of 488 nm (track pitch: 0.9 μm) in read/write/erase operation.

The total film thickness of the first dielectric film 12 and the second dielectric film 13 was set at 90 nm.

In the present case, the refractive index (1.58) of the substrate and the refractive index (1.5) of the first dielectric film are very close to each other in the same manner as in the third embodiment, and therefore almost no reflection takes place at the boundary surface. In other words, by providing the first dielectric film 12 having the same refractive index as that of the substrate 11 as well as the second dielectric film 13, the heat insulation effect between the magneto-optical film 14 and the substrate 11 can be exalted thermally while optically maintaining the conventional enhancement effect.

Repetitive data recording and erasing operations, or a repetitive data overwriting operation was effected on the same continuous tracks of each of the recording media as in the third embodiment by means of the same data read/write/erase apparatus as in the third embodiment. As a result, no such deviation of tracking as to cause troubles takes place in any case.

FIFTH EMBODIMENT

The following describes a fifth embodiment of the present invention.

Figure 8A:
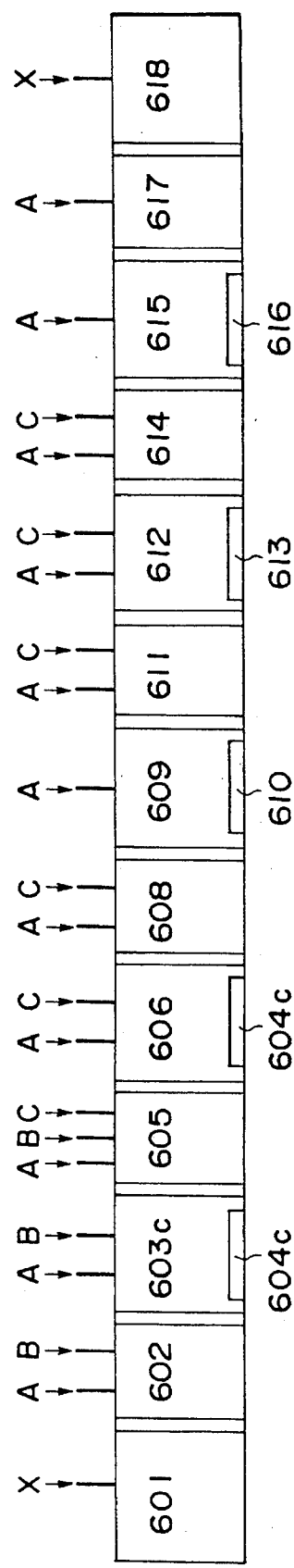
FIGS. 8(a) and 8(b) are schematic diagrams each showing an architecture of producing a magneto-optical recording medium in accordance with the present invention.

The first dielectric film 12 as shown in FIG. 1 was composed of silicon dioxide, while the second dielectric film 13 was composed of silicon nitride (refractive index: 2.0). The construction of the present embodiment is achieved by the magneto-optical recording medium producing process as shown in FIG. 8(a). The following describes magneto-optical recording medium producing processes by means of the above-mentioned apparatus.

(1) A plastic substrate is set in a loading chamber 601. After evacuation and discharge of air to achieve a specified pressure (not greater than $3 \times 10^{-4}$ pascal), the substrate is transferred to a first pressure adjusting chamber 602. Subsequently, dry nitrogen gas is introduced as a leakage gas X into the loading chamber 601 to restore an atmospheric pressure, and then the next substrate is loaded.

(2) To the first pressure adjusting chamber 602, the substrate is transferred from the loading chamber 601, and mixed gas composed of argon gas serving as a sputtering gas A and oxygen gas serving as a reactive gas B is introduced to increase the internal pressure from the vacuum condition to a pressure equal to a gaseous pressure (0.5 pascal) of a first sputtering chamber 603c. Subsequently, the substrate is transferred to the first sputtering chamber 603c.

(3) In the first sputtering chamber 603c, there was already introduced the mixed gas composed of argon gas serving as the sputtering gas A and oxygen gas serving as the reactive gas B. After the substrate is transferred from the pressure adjusting chamber 602, a silicon dioxide film is formed through reactive sputtering in a first target 604c composed of silicon, and then the substrate is transferred to a second pressure adjusting chamber 605.

(4) To the second pressure adjusting chamber 605, the mixed gas composed of argon gas serving as the sputtering gas A and oxygen gas serving as the reactive gas B is introduced to achieve a gaseous pressure (0.5 pascal) of the first sputtering chamber 603c, in which condition the substrate is transferred from the first sputtering chamber 603c. Subsequently, supply of the oxygen gas serving as the reactive gas B is stopped, and nitrogen gas serving as reactive gas C is supplied instead. Then mixed gas composed of the sputtering gas A and the reactive gas C is adjusted until the same gaseous environment as in the first sputtering chamber 603c is made equal to the gaseous pressure (0.8 pascal) of the second sputtering chamber 606. Subsequently, the substrate is transferred to the second sputtering chamber 606.

(5) In the second sputtering chamber 606, there was already introduced the mixed gas composed of argon gas serving as the sputtering gas A and nitrogen gas serving as the reactive gas C. After the substrate is transferred from the pressure adjusting chamber 605, a silicon nitride film is formed through reactive sputtering in the same target 604c as the first target composed of silicon, and then the substrate is transferred to the third pressure adjusting chamber 608.

(6) To the third pressure adjusting chamber 608, the mixed gas composed of argon gas serving as the sputtering gas A and nitrogen gas serving as the reactive gas C is introduced to achieve a gaseous pressure (0.5 pascal) of the second sputtering chamber 606, in which condition the substrate is transferred from the second sputtering chamber 606. Subsequently, supply of the nitrogen gas serving as the reactive gas C is stopped, and then the introduction amount of the sputtering gas A is adjusted until the same gaseous environment as in the second sputtering chamber 606 is made equal to the gaseous pressure (0.8 pascal) of the third sputtering chamber 609. Subsequently, the substrate is transferred to the third sputtering chamber 609.

Subsequent processes are the same as in the first embodiment. As described above, by using a metal oxide having a refractive index of about 1.5 as a first dielectric film and using a nitride material of the same metal having a refractive index of about 2.0 as a second dielectric film, an identical target can be used in forming the first dielectric film and the second dielectric film. The above allows a reduction in number of the sorts of targets to be prepared to achieve an easier production control.

In the same manner as in the third embodiment, the thus-produced second dielectric films 13 made of silicon nitride have the following film thicknesses:

(1) 80 nm for laser beam wavelength of 680 nm (track pitch: 1.3 μm) in read/write/erase operation;

(2) 60 nm for laser beam wavelength of 532 nm (track pitch: 0.9 μm) in read/write/erase operation; and (3) 55 nm for laser beam wavelength of 488 nm (track pitch: 0.9 μm) in read/write/erase operation.

The total film thickness of the first dielectric film 12 and the second dielectric film 13 was set at 90 nm.

In the present case, the refractive index (1.58) of the substrate and the refractive index (1.5) of the first dielectric film are very close to each other in the same manner as in the third embodiment, and therefore almost no reflection takes place at the boundary surface. In other words, by providing the first dielectric film 12 having the same refractive index as that of the substrate 11 as well as the second dielectric film 13, the heat insulation effect between the magneto-optical film 14 and the substrate 11 can be exalted thermally while optically maintaining the conventional enhancement effect.

Repetitive data recording and erasing operations, or a repetitive data overwriting operation was effected on the same continuous tracks of each of the recording media as in the third embodiment by means of the same data read/write/erase apparatus as in the third embodiment. As a result, no such deviation of tracking as to cause troubles takes place in any case.

SIXTH EMBODIMENT

The following describes a sixth embodiment of the present invention.

Figure 8B:
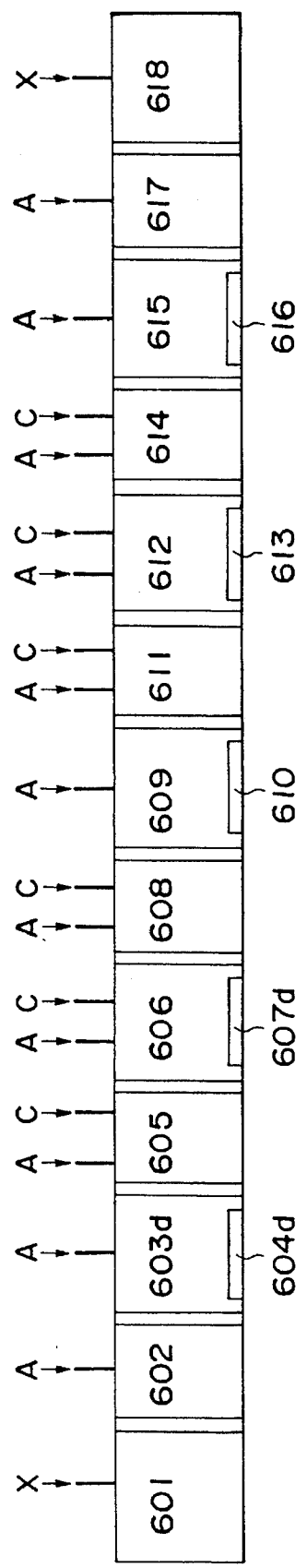

The first dielectric film 12 as shown in FIG. 1 was composed of $2MgO \cdot SiO_2$, while the second dielectric film 13 was composed of silicon nitride (refractive index: 2.0). The construction of the present embodiment is achieved by a magneto-optical recording medium producing process as shown in FIG. 8(b). The following describes magneto-optical recording medium producing processes by means of the above-mentioned apparatus.

(1) A plastic substrate is set in a loading chamber 601. After evacuation and discharge of air to achieve a pressure (not greater than $3\times10^{-4}$ pascal), the substrate is transferred to the first pressure adjusting chamber 602. Subsequently, dry nitrogen gas is introduced as a leakage gas X into the loading chamber 601 to restore an atmospheric pressure, and then the next substrate is loaded.

(2) To the first pressure adjusting chamber 602, the substrate is transferred from the loading chamber 601, and argon gas is introduced as sputtering gas A to increase the internal pressure from the vacuum condition to a pressure equal to a gaseous pressure (0.5 pascal) of a first sputtering chamber 603b. Subsequently, the substrate is transferred to a first sputtering chamber 603c.

(3) In a first sputtering chamber 603d, there was already introduced argon gas as the sputtering gas A. After the substrate is transferred from the pressure adjusting chamber 602, a first target 604d composed of $2MgO \cdot SiO_2$ is sputtered to deposit the first dielectric layer. Then the substrate is transferred to a second pressure adjusting chamber 605.

(4) To the second pressure adjusting chamber 605, argon gas is introduced as the sputtering gas A to achieve a gaseous pressure (0.5 pascal) of the first sputtering chamber 603d, in which condition the substrate is transferred from the first sputtering chamber 603d. Subsequently, nitrogen gas is supplied as a reactive gas C, and then mixed gas composed of the sputtering gas A and the reactive gas C is adjusted until the same gaseous environment as in the first sputtering chamber 603d is made equal to the gaseous pressure (0.8 pascal) of the second sputtering chamber 606. Subsequently, the substrate is transferred to a second sputtering chamber 606.

(5) In the second sputtering chamber 606, there was already introduced the mixed gas composed of argon gas serving as the sputtering gas A and nitrogen gas serving as the reactive gas C. After the substrate is transferred from the pressure adjusting chamber 605, a silicon nitride film is formed by deposition through reactive sputtering using a target 607d composed of silicon, and then the substrate is transferred to a third pressure adjusting chamber 608.

(6) To the third pressure adjusting chamber 608, the mixed gas composed of argon gas serving as the sputtering gas A and nitrogen gas serving as the reactive gas C is introduced to achieve a gaseous pressure (0.5 pascal) of the second sputtering chamber 606, in which condition the substrate is transferred from the second sputtering chamber 606. Subsequently, supply of the nitrogen gas serving as the reactive gas C is stopped, and then the introduction amount of the sputtering gas A is adjusted until the same gaseous environment as in the second sputtering chamber 606 is made equal to the gaseous pressure (0.8 pascal) of a third sputtering chamber 609. Subsequently, the substrate is transferred to the third sputtering chamber 609.

Subsequent processes are the same as in the first embodiment. As described above, the first dielectric film can be formed by using a compound target having a refractive index of about 1.5, and the second dielectric film having a refractive index of about 2.0 can be formed by using a metal target through reactive sputtering.

The thus-produced first dielectric films and the second dielectric films have the following film thicknesses:

(1) 10 nm (first dielectric film) and 80 nm (second dielectric film) for laser beam wavelength of 680 nm in read/write/erase operation;

(2) 30 nm (first dielectric film) and 60 nm (second dielectric film) for laser beam wavelength of 532 nm in read/write/erase operation; and (3) 35 nm (first dielectric film) and 55 nm (second dielectric film) for laser beam wavelength of 488 nm in read/write/erase operation.

The total film thickness of the first dielectric film 12 and the second dielectric film 13 was set at 90 nm. When the data read/write/erase laser beam wavelength is a range of from 400 nm to 680 nm, the film thickness of the first dielectric film can be made smaller than the film thickness of the second dielectric film. Therefore, the first dielectric film having the smaller film thickness is not always required to be formed through reactive sputtering in the same manner as in the present embodiment. It is in some cases rather advantageous to use a compound target for the formation of the film thickness of the first dielectric film and use the reactive sputtering for the formation of the second dielectric film in order to transfer the substrate with the film formation processes well coordinated in time.

Repetitive data recording and erasing operations, or a repetitive data overwriting operation was effected on the same continuous tracks of each of the recording media as in the third embodiment by means of the same data read/write/erase apparatus as in the third embodiment. As a result, no such deviation of tracking as to cause troubles takes place in any case.

According to the present invention as described above, the transparent first dielectric film layer having a refractive index close to the refractive index of the substrate, the second dielectric film having a high refractive index, and the magneto-optical thin film layer are formed in this order on the plastic substrate having a tracking guide groove. With the above-mentioned arrangement, the possible damage of the substrate occurring in the time of repetitively effecting a data erasing operation on continuous tracks can be avoided to allow a data rewriting operation on continuous tracks to be achieved even after a data erasing operation at a high laser intensity.

SEVENTH EMBODIMENT

The present invention as described above is effective particularly when data read/write/erase operations are effected at a laser beam wavelength being not greater than 680 nm. The present invention is also effective particularly when a data rewriting operation is repetitively effected on a recording medium provided with a tracking guide groove. However, for the purpose of effecting a data recording operation only one time, it is not necessary to use the recording medium of the present invention. In other words, the conventional construction, i.e., a construction in which the first dielectric film is not provided can be used without any problem. However, when the recording medium of the present invention, i.e., the recording medium capable of rewriting data thereon many times and the recording medium having the conventional construction are sold at the market, the users are confused.

In view of the above, it is very effective for the data read/write/erase apparatus to discriminate the recording medium of the present invention allowing the apparatus itself to determine whether or not a data rewriting operation is to be effected on the recording medium upon reception of a data rewriting command. For the above purpose, it is effective to provide the recording medium with an identification mark for discriminating whether or not a recording medium loaded is the recording medium of the present invention. The identification mark discriminates whether or not the recording medium satisfies the condition that, when the write/erase of data is continuously effected on the tracks, radial acceleration is prevented from increasing at the time of switching incident power.

Figure 9A:
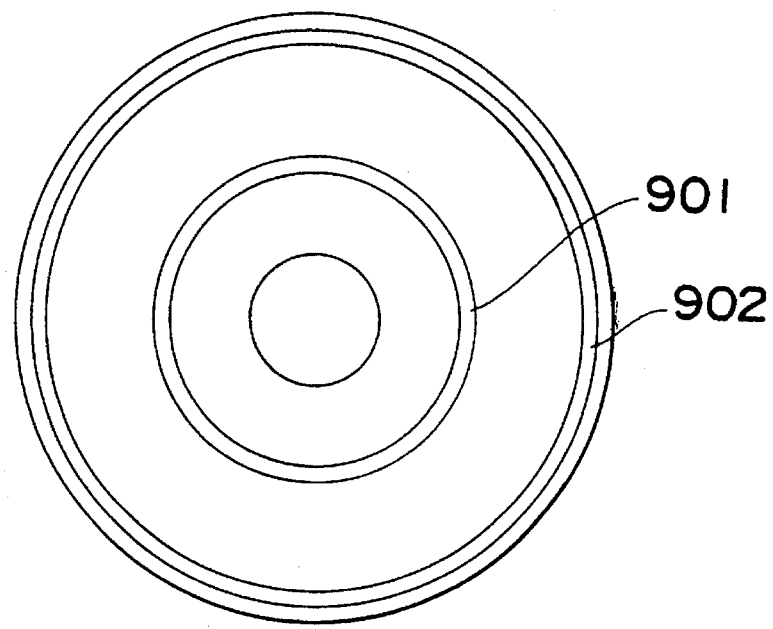
FIGS. 9(a) and 9(b) are schematic views of magneto-optical recording media each having an identification mark in accordance with the present invention.
Figure 9B:
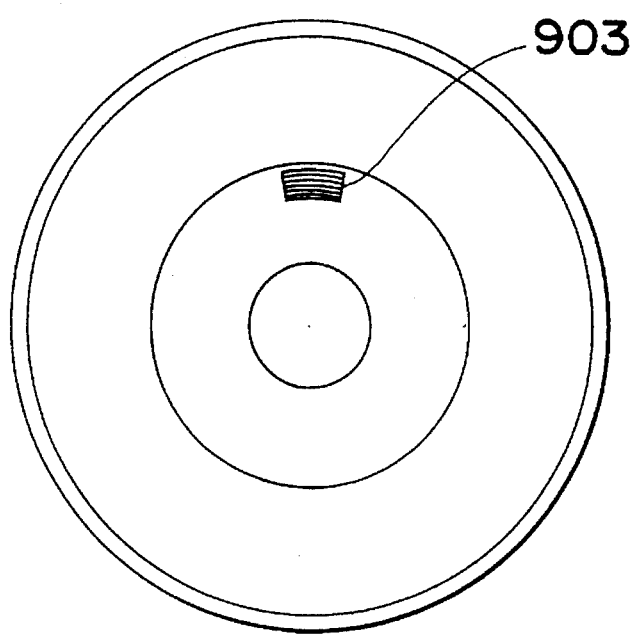

The identification mark can be provided in the form of a pit or magneto-optic signal at an innermost periphery 901 or an outermost periphery 902 of a disc-shaped recording medium in a manner as shown in FIG. 9(a). The identification mark can be read by a data reading apparatus as shown in FIGS. 7(a) and 7(b). As another means, an identification mark 903 composed of corrugation can be provided at the innermost periphery of the disc-shaped recording medium as shown in FIG. 9(b) to discriminate the recording medium by way of a change in intensity of light reflected on the corrugation.

Figure 10A:
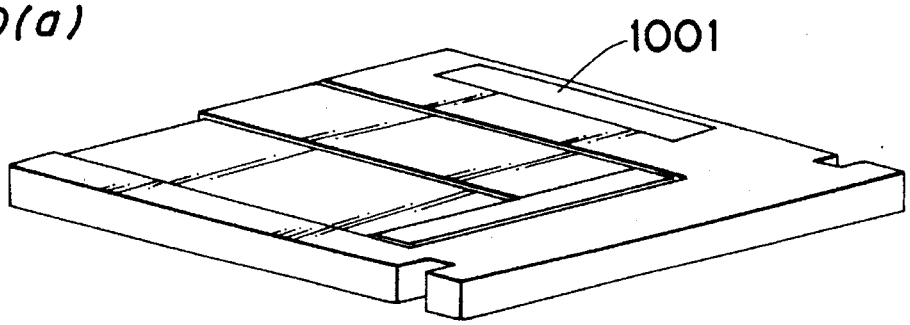
FIGS. 10(a), 10(b), and 10(c) are schematic views of magneto-optical recording media each having an identification mark on its cartridge case in accordance with the present invention.
Figure 10B:
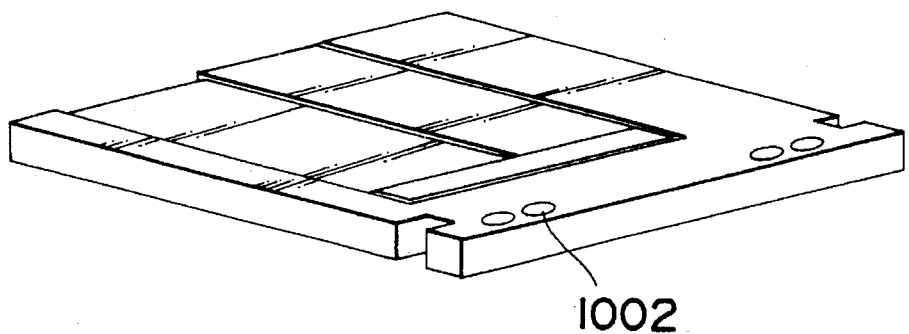
Figure 10C:
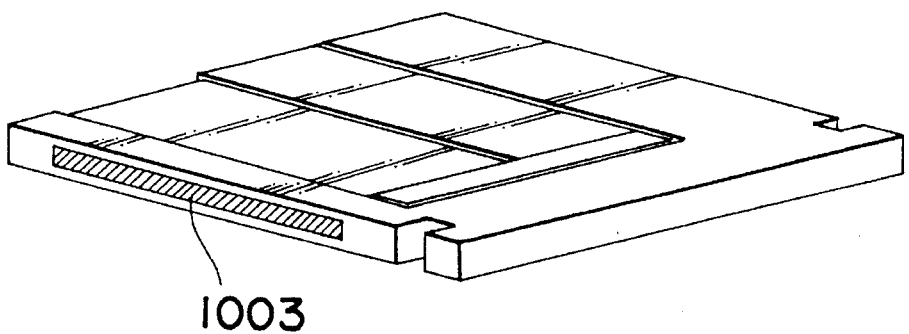

As another means, an identification mark 1001 composed of a bar code can be provided on the cartridge storing the recording disc as shown in FIG. 10(a) to discriminate whether or not the recording medium is the recording medium of the present invention by means of a data read/write/erase apparatus provided with a bar code reader. As another means, an identification mark 1002 composed of a hole can be formed on the cartridge storing the recording disc as shown in FIG. 10(b) to discriminate the hole by means of a data read/write/erase apparatus provided with an optical sensor. As another means, an identification mark 1003 composed of a magnetic tape can be provided on the cartridge storing the recording disc as shown in FIG. 10(c) to discriminate the magnetic tape by means of a data read/write/erase apparatus provided with a magnetic head.

Figure 11:
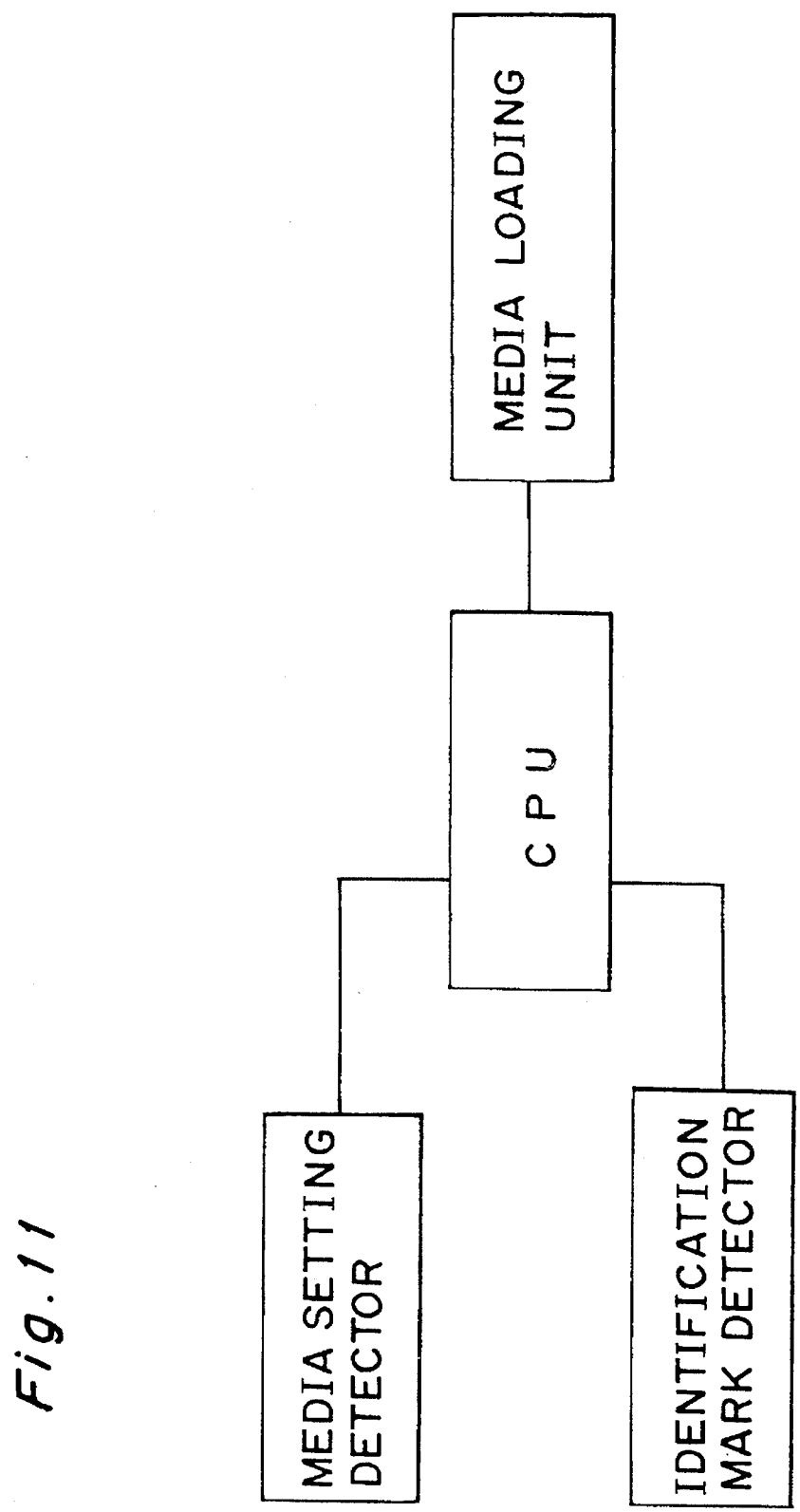
FIG. 11 is a block diagram of a drive unit for a data recording medium having an identification mark.

There is a variety of identification marks for discriminating whether or not the recording medium loaded is the recording medium of the present invention as described above, and any of the marks can be adopted. It is effective to use a data read/write/erase apparatus to which is incorporated a unit having a construction as shown in FIG. 11. FIG. 11 shows a data read/write/erase apparatus provided with a microcomputer (CPU) for issuing to a recording medium loading unit an order for determining whether or not the loaded recording medium should be ejected when a data rewriting operation is demanded based on a detection result from a detector for detecting a setting condition of the recording medium and a detector provided to the recording medium for discriminating whether or not the recording medium loaded is the recording medium of the present invention.

By using a data read/write/erase apparatus to which the above-mentioned construction is incorporated, data rewriting on a recording medium to which the present invention is not applied can be inhibited and the recording medium can be immediately ejected when a data rewriting command is issued to prevent the possible accident.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A data rewritable optical recording medium on which reading/writing of data is executed by applying a laser beam thereto, said optical recording medium comprising:

a substrate;

a first transparent dielectric layer formed on said substrate, having a refractive index in a range of not smaller than 1.4 and not greater than 1.7;

a second transparent dielectric layer formed on said first dielectric layer, having a refractive index greater than that of said first dielectric layer and having its thickness being not greater than 80 nm wherein its thickness is set in a range of not smaller than $\lambda/6.4\,n$ and not greater than $\lambda/3.9\,n$, where $\lambda$ represents the wavelength of the laser beam and n represents the refractive index of said second dielectric layer;

an optical recording layer formed on said second dielectric layer, so that said first and second dielectric layers and optical recording layer are laminated in this order on said substrate, wherein the total film thickness of said first and second dielectric layers is not smaller than 90 nm.

2. The optical recording medium as claimed in claim 1, wherein said first dielectric layer is comprised of a material having a composition of $(MgO)_x(SiO_2)_{1-x}$, where $0 \leq x \leq 0.67$.

3. The optical recording medium as claimed in claim 1, wherein said substrate is made of a plastic material, and said first dielectric layer is comprised of any one of compounds in a group consisting of $SiO_2$, MgO, and BeO, and a mixture of one of MgO, BeO, $Al_2O_3$ and silicon oxide ($SiO_2$), while said second dielectric layer is comprised of any one of compounds in a group consisting of silicon nitride ($Si_3N_4$), aluminum nitride, zinc sulfide (ZnS), zinc selenic (ZnSe), selenium sulfide, tantalum oxide ($Ta_2O_5$), and a mixture of any of the materials and silicon oxide ($SiO_2$).

4. The optical recording medium as claimed in claim 1, wherein said substrate has a tracking guide groove formed thereon.

5. The optical recording medium as claimed in claim 4, wherein a track pitch thereof is not greater than 1.3 μm.

6. The optical recording medium as claimed in claim 4, wherein write/erase of data is effected on a plurality of continuous tracks by applying a laser beam having a wavelength being not greater than 680 nm.

7. The optical recording medium as claimed in claim 6, further comprising an identification mark disposed on one of the recording medium and a cartridge case containing the recording medium, said identification mark for determining whether or not the recording medium satisfies the condition that when the write/erase of data is continuously effected on the tracks, radial acceleration is prevented from increasing at the time of switching incident power.

8. The optical recording medium as claimed in claim 7, wherein judgment whether the writing/erasing operation is effected or prohibited is based on whether said identification mark is provided or not.

* * * * *